March 9, 1926.
P. CATUCCI
FISHING REEL
Filed August 8, 1924
1,575,619
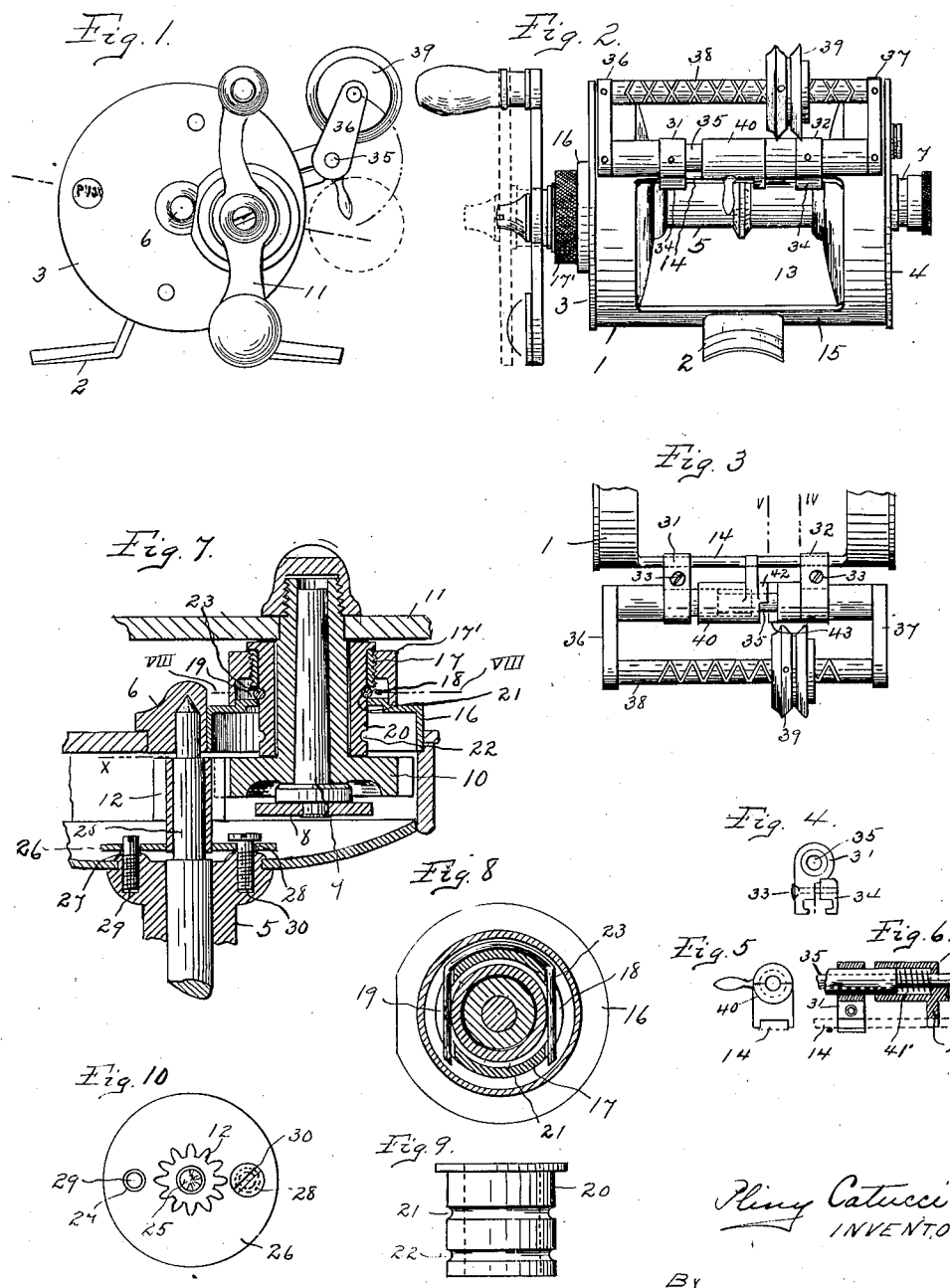

Patented Mar. 9, 1926.

1,575,619

UNITED STATES PATENT OFFICE.

PLINY CATUCCI, OF NEWARK, NEW JERSEY.

FISHING REEL.

Application filed August 8, 1924. Serial No. 730,815.

*To all whom it may concern:*

Be it known that I, PLINY CATUCCI, a citizen of the United States, residing in the city of Newark, county of Essex, and State of New Jersey, have invented a new and useful Improvement in Fishing Reels, of which the following is a specification.

In my prior applications Ser. No. 576,715 and Ser. No. 576,716 filed July 22, 1922, Ser. No. 695,181 filed Feb. 26, 1924, I have shown and described the form of reel to which my present improvement relates. The principal object of my present improvement is to provide a convenient and quickly operated throw-off mechanism whereby the spool may be freed completely from the driving gear so that the line may pay out freely from the spool.

It also contemplates the provision of means whereby the line when it is wound upon the spool shall be evenly and uniformly distributed over the spool. Another object of my improvement resides in the provision of means whereby the small pinion on the end of the spool spindle is made detachable, so that in case of its wearing out or becoming defective it may be readily removed and a new one substituted therefor. In carrying out my invention I embody the several features of improvement in the structure illustrated in the accompanying drawing, wherein—

Fig. 1 is an end elevation of my improved reel showing the level winding mechanism and the throw-off mechanism in end view.

Fig. 2 is a front elevation of the same.

Fig. 3 is a plan view of the level winding mechanism detachable from the reel frame.

Figs. 4, 5 and 6 show the detailed construction of the level winding mechanism.

Fig. 7 is an enlarged section on line VII—VII of Fig. 1.

Fig. 8 is a section on line VIII—VIII of Fig. 7.

Fig. 9 is a side view of the sleeve bearing on line VIII—VIII of Fig. 7.

Fig. 10 is a section on line X—X of Fig. 7, and showing the means for securing the detachable pinion.

Similar reference numerals refer to like parts throughout the specification and drawing.

The reel is made up of a frame or cage 1, to which the foot plate 2 is rigidly attached and in which the head plate 3 and the back plate 4 are detachably secured. The usual spool 5 is mounted to rotate in the bearings 6 in the head plate and 7 in the back plate. The head plate 3 is provided with the usual bridge 8 which supports the shaft 9 which extends outside of the head plate and has the usual driving gear 10 sleeved thereon with its crank 11 secured thereto. The spool 5 is provided with the detachable pinion 12 which when the parts are assembled engages the driving gear 10 and is driven thereby. The frame 1 is made of heavy tubing of suitable size for the purpose; the sides are cut out as at 13 to form the connecting posts 14 and the foot plate post 15 to which the foot plate 2 is rigidly secured in any suitable manner as by riveting or screws. The means for securing the head and back plates 3 and into the ends of the frame 1 may be of any of the well known fastening devices for the purpose or that particulary shown in my above named prior application 576,716. I have not deemed it necessary to specically describe the fastening means since it forms no part of my present invention.

The head plate 3 is provided with a circular aperture slightly larger than the diameter of the driving gear 10 and into said aperture is rigidly secured a dome shaped bearing extension 16, of a depth substantially the same as the thickness of the driving gear 10. From the center of this dome extends a second tubular extension 17 screw threaded at its outer end and provided with a pair of slots 18, 19 close to the surface of the dome 16. Within the tubular extension 17 I mount a sleeve bearing 20 said bearing being slidably fitted within said extension and of a length slightly less than the distance between the face of the gear 10 and the face of the crank 11 so that the gear and its shaft may freely turn within the bearing extension and yet the crank 11, the gear 10, its tubular shaft and the tubular bearing 20 may slide back and forth upon the post 9. The tubular bearing 20 is provided with a pair of circumferential grooves 21, 22 on its external surface, the groove 21 being located in such a position as to register with the slots 18, 19 in the tubular extension 17 when the gear 10 is in its inner or operative position while the other groove 22 will register with said slots when the gear is in its outer or inoperative position. Extending into the slots 18, 19 is a U shaped spring 23 the distance between the arms of which is such as to frictionally engage the tubular sleeve bearing and snap into the circumferential groove 21 or 22 therein when said sleeve bearing is pushed either in or out. In order to prevent the U shaped spring from accidental disengagement, I provide the threaded dome extension 17 with a ring shaped cover 17′ screwed down upon the outer end of said extension and having a recess upon its inner margin so as to give plenty of clearance for the U-shaped spring. It will be seen now that when the driving gear 10 is pushed into its operative position it will be held in place by means of the U shaped spring engaging in the outer groove 21 of the sleeve bearing, if however, the driving gear is pulled outwardly by grasping the crank the U-shaped spring will snap out of the outer groove 21 and into the inner groove 22 where it will hold the driving gear 10 out of engagement with the pinion 24. In this manner I am able to provide a throw-off device of very simple construction whereby the gear train will be disconnected from the spool by a simple outward pull upon the driving crank and re-engaged by a slight inward push upon said crank.

The advantage flowing from this structure is both structural and operative. The structural advantage resides in the fact that inasmuch as the disengagement of the driving gear 10 is brought about by a movement of said gear in the line of its rotative axis it follows that a larger driving gear may be used than would be the case if the driving gear were moved radially away from the center of the head plate. On the other hand if the same size driving gear is desired the diameter of the head plate and consequently the diameter of the frame 1, itself may be accordingly reduced. The operative advantage resides in the fact that in shifting from "on" to "off," or vice versa, the operator does not let go of the crank 11, since the shifting is done by pushing the crank in or pulling it out.

Closely associated with the improvement above described is another minor improvement in the making of the spool pinion detachable from the spool spindle. In the making of such pinions it is found that in practice many of them turn out to be defective and their defects are developed only when the parts of the reel are assembled. It has been the practice hitherto to mount the pinion directly upon the spindle by forcing the same upon the end thereof so as to make the pinion and spindle practically integral. This entails much trouble and difficulty in replacing the defective pinions. In order to obviate this difficulty I construct the pinion 24 with a center bore of a size to slip over the reduced end 25 of the spindle and rivet a small disc 26 to the hub of the pinion which disc is provided with a pair of diametrically disposed apertures 27, 28. In the end of the spool body a pin 29 is inserted in position to register with either of the apertures in the disc and also a small screw 30 is inserted into the spool head in registry with the other aperture so that when said screw is inserted through one of the apertures and into the spool head, the pinion is secured to the spool head against accidental displacement. However, should such pinion become defective it is only necessary to remove the screw and replace it with another pinion. In this manner the defective pinion may be readily discarded and an accurate pinion substituted therefor without the necessity of forcing the pinion free from the spool, an operation which frequently results in destroying the entire spool. This construction results in an enormous saving of time and expense in the manufacture of fishing reels of the type above described. So much of this application as relates to the detachable spool pinion is divided out of my prior application Ser. No. 695,181.

Throw off reels of the type to which my invention relates are used extensively as bait casting or fly casting reels. The line used for such purpose is very fine and usually from a hundred to one hundred and fifty yards in length. It is quite essential, therefore, that the line be uniformly distributed on the spool when wound up for the reason that in casting the line pays out very rapidly and if unevenly wound upon the spool, fouling of the line almost invariably follows.

In order to provide a simple and effective level winding mechanism which can be thrown out of action during the casting of the line and yet quickly thrown into action while winding in, I provide the following structure: Upon the forward frame post 14 are the two clamping brackets 31, 32 secured in place by means of the screws 33 passing into the clamping nuts 34 so as to secure said brackets rigidly upon the frame. In the outer ends of these brackets is secured a rock shaft 35 to the outer ends of which are secured the two arms 36, 37 which serve as supports for the double threaded screw 38 upon which is the sheave 39. This sheave is provided with an internal tooth which engages the double thread of the screw, so that when a line is run over the peripheral groove of said sheave it will cause the same to travel back and forth from one end of the screw to the other end, thereby uniformly and evenly distributing the line upon the spool. As above described, the rock shaft may be moved up or down as desired when in the upper position illustrated in full lines in Fig. 1, it is in position to properly distribute the line upon the spool. However in casting it is desirable that the level winder be thrown out of operative position so as not to interfere with the free running out of the line. In order to accomplish this result and at the same time provide means for locking the rock shaft in operative position I mount upon the rock shaft a sliding clutch mechanism in the form of a spring sleeve 40 guided by the arm 41 which engages the frame post 14 so that by pulling back said sleeve against its internal spring 41' the arms 36, 37 carrying the double threaded screw 38 may be turned down into the dotted line position shown in Fig. 1 in which position the clutch members 42, 43 will occupy the position shown in Fig. 3. Upon the completion of the cast and when ready to wind in the line, it is only necessary to turn the rock shaft with its double threaded screw 38 and sheave 39 back into its upper position when of course the spring sleeve clutch will snap back into place and thus lock the rock shaft in its operative position ready to wind in the line and uniformly distribute it upon the spool. When the reel is used for another purpose than for bait casting or fly casting it may be desirable to dispense with the level winding mechanism. In such case it is only necessary to loosen the clamping screws 33 and remove the level winder and use the reel in the usual manner. If desired it may still be kept on the reel by turning it down into its inoperative position. The making of the level winder detachable has also the additional advantage of being able to attach it to other reels should the one in use get out of order for any reason whatsoever.

The cooperation of the level winding mechanism with the throw-off mechanism will be readily appreciated by the expert bait casting fishermen. In casting as above described, the level winding mechanism is thrown out of operative position while the operator is swinging the rod with the short length of the line extending therefrom. When the proper momentum is acquired the driving gear of the reel is disconnected from the spool pinion by a quick pull upon the crank 11, thus freeing the spool from any unnecessary drag or tension upon the line thereby permitting the sinker to be cast to the greatest distance possible. The operator noting the instant of strike reshifts his gear by pressing inwardly upon the crank 11 thereby checking the over running and consequent fouling of the line. The operator is now prepared to wind in his line since the gear is thrown on and it is only necessary for him to reach forward with his left hand, turn the arms 36, 37 up into the full line position shown in Fig. 1 and see that the line is properly disposed in the peripheral groove of the sheave 39 when the winding in operation may follow.

Level winders of the general type disclosed are common but I am not aware that any have been constructed with means for detachably connecting the same to the reel frame or which provide means for throwing it into and out of operative position.

While I have disclosed the preferred forms of construction of my improved fishing reel yet I do not wish to be considered as confining my improvement to the exact forms disclosed, minor changes in detail coming within the scope of my invention will readily suggest themselves to others skilled in the art. I desire therefore, that the appended claims shall be interpreted to include such modifications as may come within the spirit and scope of my invention.

I claim:

1. In a fishing reel, the combination of a reel frame, a head plate, a back plate a spool mounted to rotate in bearings in said head and back plates, a driving gear upon said head plate a detachable pinion mounted upon the spindle of said spool for engaging said gear, and means for operatively connecting said pinion with said spool comprising a disc rigidly secured to said pinion and having a plurality of apertures therethrough, and a pin in the end of said spool adapted to be inserted in any one of said apertures.

2. In a fishing reel, the combination of a reel frame, a spool rotatably mounted thereon, a pinion sleeved upon the spindle of said spool, a disc rigidly secured to said pinion and having a plurality of apertures therein, and a pin in the end of said spool adapted to enter any one of said apertures and frictionally engage the same, whereby said pinion may be removed from said spindle for replacement.

3. In a fishing reel, the combination of a line spool having a supporting spindle, a pinion detachably mounted upon said spindle, a disc rigidly secured to said pinion and said disc having a pair of diametrically located apertures, a pin projecting from the end of said spool into one of said apertures, and a screw extending through the other aperture into the spool head.

PLINY CATUCCI.